United States Patent
Li et al.

(10) Patent No.: US 11,274,043 B2
(45) Date of Patent: Mar. 15, 2022

(54) INCREASED PARTICLE LOADING BY SURFACE MODIFICATION WITH POLYETHERSILANE

(71) Applicants: Evonik Operations GmbH, Essen (DE); Evonik Corporation, Parsippany, NJ (US)

(72) Inventors: Zhifeng Li, Acton, MA (US); Helmut Mack, Traunstein (DE)

(73) Assignees: Evonik Operations GmbH, Essen (DE); Evonik Corporation, Parsippany, NJ (US)

( * ) Notice: Subject to any disclaimer, the term of this patent is extended or adjusted under 35 U.S.C. 154(b) by 52 days.

(21) Appl. No.: 16/435,638

(22) Filed: Jun. 10, 2019

(65) Prior Publication Data

US 2019/0375643 A1    Dec. 12, 2019

Related U.S. Application Data

(60) Provisional application No. 62/684,059, filed on Jun. 12, 2018.

(51) Int. Cl.
*C01B 33/149* (2006.01)
*C09K 3/14* (2006.01)

(52) U.S. Cl.
CPC .......... *C01B 33/149* (2013.01); *C09K 3/1409* (2013.01); *C09K 3/1436* (2013.01)

(58) Field of Classification Search
CPC .. C09K 3/1409; C09K 3/1463; C09K 3/1436; C09K 3/1454; C01B 33/02
See application file for complete search history.

(56) References Cited

U.S. PATENT DOCUMENTS

| | | | | |
|---|---|---|---|---|
| 8,529,787 | B2 * | 9/2013 | Higuchi | ............... C09K 3/1409 |
| | | | | 252/79.1 |
| 2006/0150860 | A1 | 7/2006 | Nozaki | |
| 2010/0071272 | A1 * | 3/2010 | Higuchi | ................ C01B 33/141 |
| | | | | 51/308 |
| 2018/0105430 | A1 * | 4/2018 | Carnes | ................. A61K 9/5123 |

FOREIGN PATENT DOCUMENTS

| | | |
|---|---|---|
| JP | H11-60232 | 3/1999 |
| JP | 2001048520 A * | 2/2001 |
| WO | 2004/074180 | 9/2004 |

OTHER PUBLICATIONS

Ibrahim et al, "Preparation of spherical silica nanoparticles: Stober silica," Journal of American Science, 2010;6(11): 985-989.

* cited by examiner

Primary Examiner — Pegah Parvini
Assistant Examiner — Ross J Christie
(74) Attorney, Agent, or Firm — Grüneberg and Myers PLLC

(57) ABSTRACT

A modified colloidal silica is produced by mixing an effective amount of an alkyl silicate to form a colloidal silica, followed by treating the colloidal silica with an effective amount of a polyethersilane to form a modified colloidal silica.

14 Claims, No Drawings

INCREASED PARTICLE LOADING BY SURFACE MODIFICATION WITH POLYETHERSILANE

CROSS-REFERENCE TO RELATED APPLICATIONS

The present application claims the benefit of U.S. Provisional Application 62/684,059, filed on Jun. 12, 2018, which is incorporated by reference in its entirety.

BACKGROUND OF THE INVENTION

Field of the Invention

The present invention relates to a modified colloidal silica and a method for producing the same. Specifically, the present invention relates to surface modified colloidal silica suitable as a polishing material, and to a method for producing the same.

Discussion of the Background

A colloidal silica is a dispersion of silica fine particles in a liquid and is used not only as a property improving agent in the fields of papers, fibers, steel, and the like, but also as a polishing material for electronic materials, such as semiconductor wafers.

Currently there are primarily two production methods for colloidal silica, including the water glass method and the alkoxide method.

The water glass method uses sodium or potassium silicate that has been heated from a heat exchanger to seed particles in aqueous solution. This method promotes the possibility of obtaining a relatively dense seed stricture. Water glass-derived colloidal silica carries a significant metal ion load.

The alkoxide method, otherwise known as the Stöber process, comprises subjecting an alkyl silicate (tetraalkoxysilane) to hydrolyzation and condensation in the presence of a basic catalyst to grow particles, thereby producing silica particles. This method enables the preparation of colloidal particles having particle sizes ranging from nano- to microscale (JPH 11-60232). Several other production methods of silica particles utilizing the alkoxide method, etc. are known in the art (WO2004/074180).

US Pub. No. 2010/0071272 discloses a preparation of a colloidal silica having a dense structure in which the siloxane bonds are fully formed, with reduced amount of residual silanol groups.

Currently, the colloidal silica in the art still faces certain undesirable features because it is unstable at high loading. For example, the common use of the silica loading at 30 wt % in water remains unstable. The silica dispersion will either form a gel or lead to sedimentation at this loading based on the unstable nature of the silica loading. It would be an improvement in the industry to increase the stability of the colloidal silica by increasing its loading. There is, therefore, a need in the art for silica particles having increased particle loading at a level to the highest extent possible.

SUMMARY OF THE INVENTION

In an embodiment, this invention is directed to a modified colloidal silica produced by mixing an effective amount of an alkyl silicate to form a colloidal silica, followed by treating the colloidal silica with an effective amount of a polyethersilane to form a modified colloidal silica.

In an embodiment the alkyl silicate of the modified colloidal silica is a tetraalkyl orthosilicate. The tetraalkyl orthosilicate may be a tetramethyl orthosilicate or tetraethyl orthosilicate.

In an embodiment of this invention, the polyethersilane may be
a polyethersilane of the formula:

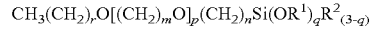

where $R^1$ is a methyl or ethyl group,
$R^2$ is a methyl or ethyl group,
n=0-4,
p=0-30,
m=1-3,
r=0-5, and
q=1-3.

In an embodiment, $R^1$ is a methyl group.
In an embodiment, $R^2$ is a methyl group.
In an embodiment, n is 1-3. In another embodiment, n is 3.
In an embodiment, p is 1-7. In another embodiment, p is 2-5.
In an embodiment, m is 2.
In an embodiment, r is 0.
In an embodiment, q is 3.
In an embodiment, the polyethersilane is 2-[methoxy(polyethyleneoxy)propyl]trimethoxysilane.
In another embodiment, the polyethersilane is 2-[methoxy(polyethyleneoxy)propyl]methyldimethoxysilane.
In another embodiment, the polyethersilane is 2-[methoxy(polyethyleneoxy)propyl]dimethylmethoxysilane.

In another embodiment, this invention is directed to a polishing material comprising the modified colloidal silica of embodiment 1.

In another embodiment, this invention is directed to a method for producing a modified colloidal silica, by preparing a mother liquid comprising an alkali catalyst and water; adding an amount of a hydrolyzed liquid obtained by hydrolyzing an alkyl silicate to the mother liquid forming a colloidal silica; and treating the colloidal silica with an amount of polyethersilane to form a modified colloidal silica.

In an embodiment, this invention also includes a step of preparing the hydrolyzed liquid by hydrolyzing an alkyl silicate in the absence of a catalyst.

In an embodiment, the mother liquid further comprises seed particles.

In an embodiment, the alkyl silicate is a tetraalkyl orthosilicate, and the tetraorthosilicate may be tetramethyl orthosilicate or tetraethyl orthosilicate.

The term "weight % solids" of the monomer solution refers to the weight of the sum of all the monomers and other components with the exception of water expressed as a percentage of the weight of the total silica mixture of a given recipe including the water.

The term "% by weight" or "% wt" as used herein and referring to components of the dry silica particles, is to be interpreted as based on the weight of the dry silica particles, unless otherwise specified herein.

As used herein, a range "X to Y" means "X or more (higher) and Y or less (lower)". Moreover, "weight" is synonymous with "mass", "wt %" is synonymous with "mass %", and "parts by weight" is synonymous with "parts by mass". Moreover, unless otherwise noted, "ppm" means "ppm by weight" or "ppm by mass".

The present invention further relates to the following embodiments:
1. A modified colloidal silica produced by mixing an alkyl silicate to form a colloidal silica, followed by treating the colloidal silica with an amount of a polyethersilane to form a modified colloidal silica.
2. The modified colloidal silica of embodiment wherein 0.1-10 wt % of the polyethersilane, based on the weight of a mother liquid of colloidal silane, is used to treat the mother liquid of the colloidal silica.
3. The modified colloidal silica of embodiment 1, wherein the alkyl silicate is a tetraalkyl orthosilicate.
4. The modified colloidal silica of embodiment 3, wherein the tetraalkyl orthosilicate is tetramethyl orthosilicate or tetraethylorthosilicate.
5. The modified colloidal silica of embodiment 1, wherein the polyethersilane is represented by the formula $CH_3(CH_2)_rO[(CH_2)_mO]_p(CH_2)_nSi(OR^1)_qR^2_{(3-q)}$
where,
$R^1$ is a methyl or ethyl group,
$R^2$ is a methyl or ethyl group,
n=0-4,
p=0-30,
m=1-3,
r=0-5, and
q=1-3.
6. The modified colloidal silica of embodiment 5, where
$R^1$ and $R^2$ are methyl groups,
n is 1-3,
p is 1-7,
m is 2,
r is 0 and
q is 3.
7. The modified colloidal silica of embodiment 5, wherein n is 3 and p is 2-5.
8. The modified colloidal silica of embodiment 7, wherein the polyethersilane is
2-[methoxy(polyethyleneoxy)propyl]trimethoxysilane,
2-[methoxy(polyethyleneoxy)propyl]methyldimethoxysilane, or
2-[methoxy(polyethyleneoxy)propyl]dimethylmethoxysilane.
9. A polishing material comprising the modified colloidal silica of embodiment 1.
10. A method for producing a modified colloidal silica, comprising the steps of: 1) preparing a mother liquid comprising an alkali catalyst and water; 2) adding an amount of a hydrolyzed liquid obtained by hydrolyzing an alkyl silicate to the mother liquid forming a colloidal silica; and 3) treating the colloidal silica with an amount of polyethersilane to form a modified colloidal silica.
11. The method of embodiment 10, wherein 0.1-10 wt % of the polyethersilane, based on the weight of a mother liquid of colloidal silane, is used to treat the mother liquid of the colloidal silica.
12. The method of embodiment 10, further comprising a step of preparing the hydrolyzed liquid by hydrolyzing an alkyl silicate in the absence of a catalyst.
13. The method of embodiment 10, wherein the mother liquid further comprises seed particles.
14. The method of embodiment 10, wherein the alkyl silicate is a tetraalkyl orthosilicate.
15. The method of embodiment 14, wherein the alkyl silicate is tetramethyl orthosilicate or tetraethyl orthosilicate.
16. The method of embodiment 10, wherein the polyethersilane is
2-[methoxy(polyethyleneoxy)propyl]trimethoxysilane,
2-[methoxy(polyethyleneoxy)propyl]methyldimethoxysilane, or
2-[methoxy(polyethyleneoxy)propyl]dimethylmethoxysilane.

DETAILED DESCRIPTION OF THE INVENTION

The present application responds to the needs in the art by developing a new technology to make polyethersilane modified high purity silica particles by the Stoeber process.

In this invention, high particle loading is an important aspect of the process to increase the efficiency of the colloidal dispersion. Particle loading is the weight percent of silica particles that can be loaded into the silica-water dispersion without any dispersion stability issues. Usually, there is a maximum loading of specific particles in the dispersion that can still keep the dispersion stable (DLVO theory). Exceeding the maximum loading will lead to instability of the colloidal dispersion and will cause sedimentation or gelation in the dispersion.

In an embodiment, the high purity silica particles are used as abrasives in the chemical mechanical polishing in the semiconductor industry.

The present advancement uses surface modification on the silica to increase the stability of the silica loading. In this invention, surface modification has been shown to increase the stability of silica loading up to about 30 wt % in water. Without surface modification on the Stöber particle silica surface in the present invention, the silica loading will likely to be unstable at the level of silica loading of up to 30 wt % in water.

While typical aspects of embodiment and/or embodiments have been set forth for the purpose of illustration, this Detailed Description of the Invention should not be deemed to be a limitation on the scope of the invention. Accordingly, various modifications, adaptations, and alternatives may occur to one skilled in the art without departing from the spirit and scope of the present invention.

In this invention, the alkyl silicate is chosen from an alcoholic solution of colloidal silica. In an embodiment, an ethanolic solution of colloidal silica with a solid content from 20-23 wt %, calculated as silicone dioxide ($SiO_2$) is used. Examples of alkyl silicate in this invention include tetraalkyl orthosilicate, in particular, tetramethyl orthosilicate or tetraethyl orthosilicate.

In this invention, the concentration of polyethersilane used is 0.1-10 wt %, based on the weight of the mother liquid of colloidal silica. In an embodiment, 0.5-5 wt % of polyether silane, based on the weight of the mother liquid of colloidal silica, is used. In another embodiment, 1-4 wt % of polyethersilane, based on the weight of the mother liquid of colloidal silica, is used. In another embodiment, 2.5 to 3.5 wt % of polyethersilane, based on the weight of the mother liquid of colloidal silica, is used. In another embodiment, 3 wt % of polyethersilane, based on the weight of the mother liquid of colloidal silica, is used.

Examples of polyethersilane that are contemplated in this invention are
2-[methoxy(polyethyleneoxy)propyl]trimethoxysilane (also called Type A below),
2-[methoxy(polyethyleneoxy)propyl]methyldimethoxysilane (also called Type B below), and 2-[methoxy(polyethyleneoxy)propyl]dimethylmethoxysilane (also called Type C below).

It is contemplated that the modified colloidal silica is used as a part of a polishing material in the semiconductor industry.

In preparing the modified colloidal silica of this invention, a mother liquid of colloidal silica is made using an alkali catalyst and water, through the "Stöber method" (see, for example, Journal of American Science, 2010; 6(11), pp 985-989). The amount of a hydrolyzed liquid obtained by hydrolyzing an alkyl silicate is then directed to the mother liquid forming a colloidal silica. In an embodiment, a catalyst is used. In another embodiment, the seed particles may have a size of 60 nm. Then the mother liquid of colloidal silica is treated with an amount of polyethersilane to form the modified colloidal silica as shown by the examples below.

EXAMPLES

In accordance with the invention, the modified colloidal silica and the method for making the same as set forth in the embodiments can be achieved using the examples described herein.

Example I

Silica nanoparticles were prepared according to the Stöber method by hydrolysis and condensation of tetraethyl silicate (TEOS) in ethanol, and in presence of ammonia as catalyst.

First, solution containing appropriate quantities of absolute ethanol, ammonia and water, were stirred for 5 minutes at room temperature to ensure complete mixing. Then, a proper amount of TEOS was added at a certain rate to the above solution and the reaction proceeded at ambient temperature for 4 hours. Thus, we obtained a Stöber type colloidal silica with around 60 nm particle size with particle solid content around 5 wt %.

In order to increase the solid content to the optimal weight range of about 20-23 wt %, the above solution can be further heated to the boiling point of the solution and distilled out of solvent and water until the solid content reaches 20-23 wt %. At a solid content of 20-23 wt %, the above solution is still in a stable state. However, further distillation leading the solid content to reach up to a solid content of about 25 wt % will cause the colloidal silica solution to become unstable and formation to gel.

Example II

In comparison, several parallel experiments to effect the surface modification of colloidal silica were conducted. In this invention, the following three types of polyethersilanes (herein designated as Type A, Type B and Type C, each with a different number of reactive methoxysilane groups, as described below) were added to the above solution when it reached 20 wt % solid. The polyethersilanes were added in an amount of 5 wt %, 10 wt %, 15 wt %, and 20 wt %, calculated as $SiO_2$. After the addition of the silane, the solution continued to be mixed, allowing the silane to react with silica at elevated temperature. The methoxysilane group from polyethersilane reacted on the silica surface, causing the polyethersilane to graft on the colloidal silica surface. The surface modification was considered to be completed after 2-4 hours (at STP) and then further distillation was performed to concentrate the colloidal silica solution.

Polyethersilanes Used in this Example

Type A: 2-[methoxy(polyethleneoxy)propyl]trimethoxysilane (CAS-Number: 65994-07-2); a polyethersilane with three methoxysilane groups, e.g. commercially available as Dynasylan® 4148.
Type B: 2-[methoxy(polyethyleneoxy)propyl]methyldimethoxysilane; a polyethersilane with two methoxysilane groups.
Type C: 2-[methoxy(polyethyleneoxy)propyl]dimethylmethoxysilane; a polyethersilane with one methoxysilane group.

As a result of the above polyethersilane surface modification, some colloidal silica solutions were capable of reaching the advantageous solid content of up to 40 wt %. Stability was maintained for several months. This was compared to the silica without benefit of surface modification, which could only reach 25 wt %. The silica without surface modification also gelled after 1 day.

The following table summarizes the experiment data we have for the above 60 nm alkoxysilane based colloidal particles in aqueous solution:

| | 20 wt % solid content | 25 wt % solid content | 35 wt % solid content | 40 wt % solid content |
|---|---|---|---|---|
| Untreated 60 nm Stöber colloidal silica particles | Stable | Unstable | Unstable | Unstable |
| 60 nm Particles treated by Type A Silane | Stable | Stable | Stable | Unstable |
| 60 nm Particles treated by Type B Silane | Stable | Stable | Stable | Unstable |
| 60 nm Particles treated by Type C Silane | Stable | Stable | Stable | Stable |

Based on the results above in Example II, polyethersilane surface modification allowed the increase in the maximum solid content of alkoxysilane based colloidal particles in aqueous solution from 25 wt % to >35 wt %. Based on the three types of surface modification agent, the polyethersilane with mono-methoxysilane group is the most preferred one since there was less crosslinking or self condensation of the polyethersilane when reacted with colloidal silica in water.

Example III

A commercially available silica (Fuso PL-3 primary particle size 35 nm, with 20 wt % solid content, available from Fuso Chemical Co., Ltd., Osaka, Japan) was used to perform the same experiment as in Example II above.

Result of the above test are as follows:

| | 20 wt % solid content | 25 wt % solid content | 35 wt % solid content | 40 wt % solid content |
|---|---|---|---|---|
| Untreated FUSO PL-3 colloidal silica sample | Stable | Unstable | Unstable | Unstable |
| Fuso PL-3 treated by Type A Silane | Stable | Stable | Stable | Unstable |
| Fuso PL-3 treated by Type B Silane | Stable | Stable | Stable | Unstable |
| Fuso PL-3 treated by Type C Silane | Stable | Stable | Stable | Stable |

The experiments using two different types of silica with the same polyethersilane with three methoxysilane groups confirms the same results. The polyethersilane surface modification allowed the increase in the maximum solid content of alkoxysilane based colloidal particles in aqueous solution from 25 wt % to >35 wt %. Based on the three types of surface modification agent, the polyethersilane with mono-methoxysilane group is the most preferred one.

It can be shown that the high solid loading of this polyethersilane surface modified high purity colloidal silica aqueous solution has advantages in lowering the shipping and processing costs. Additionally, the high solid loading of this polyethersilane surface modified high purity colloidal silica aqueous solution increases the flexibility of the formulation in CMP slurries.

What is claimed is:

1. A modified colloidal silica produced by a process comprising:
   mixing an alkyl silicate to form a colloidal silica and
   treating a surface of the colloidal silica with an amount of a polyethersilane to form a modified colloidal silica with the surface modified, wherein the polyethersilane is 2-[methoxy(polyethyleneoxy)propyl]dimethylmethoxysilane.

2. The modified colloidal silica of claim 1, wherein 0.1-10 wt % of the polyethersilane, based on the weight of a mother liquid of colloidal silane, is used to treat the mother liquid of the colloidal silica.

3. The modified colloidal silica of claim 1, wherein the alkyl silicate is a tetraalkyl orthosilicate.

4. The modified colloidal silica of claim 3, wherein the tetraalkyl orthosilicate is at least one selected from the group consisting of tetramethyl orthosilicate and tetraethyl orthosilicate.

5. A polishing material, comprising: the modified colloidal silica of claim 1.

6. A method for producing a modified colloidal silica, comprising:
   1) preparing a mother liquid comprising an alkali catalyst and water;
   2) adding an amount of a hydrolyzed liquid obtained by hydrolyzing an alkyl silicate to the mother liquid forming a colloidal silica; and
   3) treating a surface of the colloidal silica with an amount of polyethersilane to form a modified colloidal silica with the surface modified, wherein the polyethersilane is 2-[methoxy(polyethyleneoxy)propyl]dimethylmethoxysilane.

7. The method of claim 6, wherein 0.1-10 wt % of the polyethersilane, based on the weight of a mother liquid of colloidal silane, is used to treat the mother liquid of the colloidal silica.

8. The method of claim 6, further comprising:
   preparing the hydrolyzed liquid by hydrolyzing the alkyl silicate in absence of the catalyst.

9. The method of claim 6, wherein the mother liquid further comprises seed particles.

10. The method of claim 6, wherein the alkyl silicate is tetraalkyl orthosilicate.

11. The method of claim 10, wherein the alkyl silicate is tetramethyl orthosilicate or tetraethyl orthosilicate.

12. The modified colloidal silica of claim 1, wherein during the treating a methoxysilane group of the polyethersilane reacts with the surface of the colloidal silica causing the polyethersilane to graft on the colloidal silica surface.

13. An aqueous solution of the modified colloidal silica of claim 1, wherein the aqueous solution has a solid content of 25 wt % to 40 wt %.

14. The method of claim 6, wherein during the treating a methoxysilane group of the polyethersilane reacts with the surface of the colloidal silica causing the polyethersilane to graft on the colloidal silica surface.

* * * * *